Figure 1:
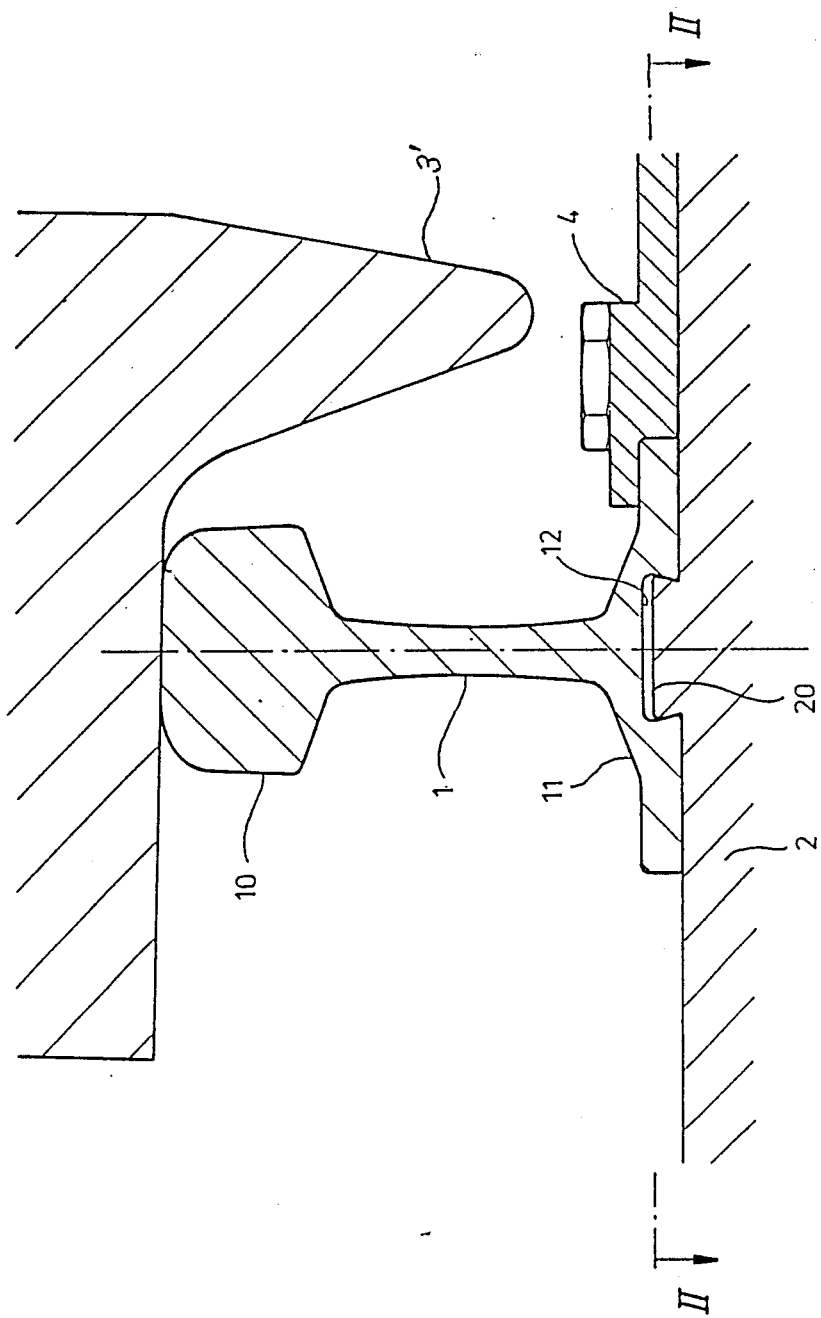

United States Patent [19]

Schuller

[11] Patent Number: 4,817,867

[45] Date of Patent: Apr. 4, 1989

[54] TRACK INSTALLATION FOR MODEL RAILWAYS

[76] Inventor: Wolfgang Schuller, 26, Am Parkfriedhof, 4300 Essen 1, Fed. Rep. of Germany

[21] Appl. No.: 111,024

[22] PCT Filed: Dec. 18, 1986

[86] PCT No.: PCT/EP86/00761
§ 371 Date: Aug. 21, 1987
§ 102(e) Date: Aug. 21, 1987

[87] PCT Pub. No.: WO87/03817
PCT Pub. Date: Jul. 2, 1987

[30] Foreign Application Priority Data

Dec. 21, 1985 [DE] Fed. Rep. of Germany ....... 3545710

[51] Int. Cl.$^4$ ............................................. A63H 19/30
[52] U.S. Cl. .................. 238/10 A; 238/10 E; 403/331; 403/381
[58] Field of Search ................. 238/10 E, 10 A, 10 R, 238/30, 83, 84, 122, 151, 141, 175, 187, 216, 318, 14.4, 14.14; 403/331, 353, 381

[56] References Cited

U.S. PATENT DOCUMENTS

| 820,722 | 5/1906 | Lindsay | 238/141 |
| 1,363,322 | 12/1920 | Kaczmarek et al. | 238/175 |
| 2,138,340 | 11/1938 | Chemidlin | 238/122 X |
| 2,631,784 | 3/1953 | Anderson | 238/84 |
| 2,801,895 | 8/1957 | Gass | 403/381 X |
| 4,219,153 | 8/1980 | Cheng | 238/10 E |
| 4,403,733 | 9/1983 | Bach et al. | 238/10 E |

FOREIGN PATENT DOCUMENTS

| 942499 | 2/1974 | Canada | 238/10 E |
| 310527 | 10/1955 | Switzerland . | |

Primary Examiner—Johnny D. Cherry
Assistant Examiner—Dean J. Kramer

[57] ABSTRACT

In order to reduce the rail height to proportions corresponding to those of original railways while maintaining enough ground clearance, for wheels provided with European wheel flanges (3), a groove (12) running parallel to the longitudinal axis of the rails and having a dove-tailed cross-section is formed in the sole surface of each rail foot (11) of both rail sections (1) mounted on sleepers (2). A projection (20) is formed on the upper side of each sleeper (2), corresponding to both rail sections (1) and having a cross-section profile form-fitting and/or frictionally engaged within the groove (12).

9 Claims, 3 Drawing Sheets

TRACK INSTALLATION FOR MODEL RAILWAYS

The invention relates to a track system for model railways in which two rails are mounted by fastening means on crossties.

According to the "Normen europaeischer Modellbahnen" [European model railway standards] (NEM) the rails of model railways have a section height H between 2.0 and 5.0 mm, depending on the track gauge. In the case of the common track gauges between 12.0 and 22.5 mm corresponding to a section height of 2.0 to 2.5 mm, rail fasteners made according to the NEM standards are used. These track gauges and section dimensions are adapted to the dimensions of the flanges of the wheels. In the case of a track gauge of 16.5 mm the wheel flange height according to NEM 311/1 is $D = 1.0 - 1.4$ mm.

The section heights according to the NEM are disproportionally large. This is noticeable even in the case of the HO gauge tracks most widely used, and is greatly disliked by the impassioned model railroader as a plainly visible departure from the natural situation.

On the other hand, according to the American NMRA standard, there are tracks of the same gauge with average section heights of 1.8 mm matched to the original. These American track products, however, are not usable in conjunction with the European railway car designs in spite of being for the same track gauge, since the oversize wheel flanges have too little ground clearance and would strike against the upwardly projecting track fasteners of the rail systems constructed according to the American standard. In striving for true scale-model replication of the original railroad, the European railway car models are therefore provided with different sets of wheels in order to adapt them to the American standard rail section. In particular, the excessively high flanges of all wheels have been turned down at considerable cost of money and effort.

Accordingly, the invention is addressed to the problem of creating a track system for model railways which will permit the rail height to be reduced to the proportions corresponding to the original while providing sufficient ground clearance for wheels provided with European flanges.

The solution of this problem is, according to the invention, to form in the bottom of each rail flange a groove of substantially dovetail-shaped cross section running parallel to the longitudinal axis of the rail, and to form on the top side of each crosstie a projection associated with [each of] the two rails, which has a cross-sectional profile fitting into the groove in an interlocking or friction-fitting manner.

This configuration of the track system according to the invention provides for the rails to be fastened onto the crossties without the rail fasteners that laterally hold and overlap the rail flanges and limit the ground clearance of the wheel flanges. Low replicas of rail fasteners or rail clamps without any actual holding function can, if desied, be mounted by clamping or snap-fastening or cementing onto the crossties. Therefore the rail corresponding in size to the original will be clear on both sides all the way down to the rail flange, so that wheels even with comparatively oversize flanges can run on the rails in an interference-free manner. The two rails can be fastened onto the corresponding crossties even at the factory; on the other hand, however, retrofitting of the two rails onto the crossties or onto appropriate strips of crossties is easily possible, so that the model railroader can custom-design his track system.

A preferred further development of the invention is characterized in that the groove in each rail is widened at least on one side at intervals according to the tie spacing to form a socket, and the projection on the tie is in the form of a button which can snap into the socket. This further development mainly facilitates the assembly of the track system on the part of the user, since the user can use rails and crossties to assemble either straight sections of track or curved sections of track with matching crosstie angles in any way he chooses.

The widening of the groove is preferably in the shape of a wedge or of a sector of a circle. Instead of the connecting links overlapping the rail flanges, as commonly used in conventional track systems, the invention provides a connecting link in band form made of electrically conductive material to produce the mechanical and the electrical, if any, connection between two sections of track, or of electrically nonconductive plastic as insulating connecting links. On the flat side facing the rails such connecting links have at least one projection whose profile matches the crosstie projections, and on the side facing the crossties a socket mating with the crosstie projections. Crossties connected together by a strip have a thickness which is reduced to accommodate the connecting link thickness at least in the area of the connection.

Additional details and advantages of the invention will be found in the description that follows of an embodiment represented in the drawing. In the drawing, FIG. 1 is a cross section taken through a rail along with the fastening means according to the invention for joining the rail to the crosstie, showing a partial cross section of a wheel with a European wheel flange which is placed on the head of the rail, FIG. 2 is a horizontal cross section on a smaller scale than FIG. 1 taken through the rail flange in the direction of the arrows II—II in FIG. 1, showing two crossties, FIG. 3 is a partially sectioned perspective detail of the track system in the area of a junction between two sections of rail, and FIG. 4 is a horizontal cross section, similar to that of FIG. 2, showing a wedge-shaped widening of the rail.

Figure 2:
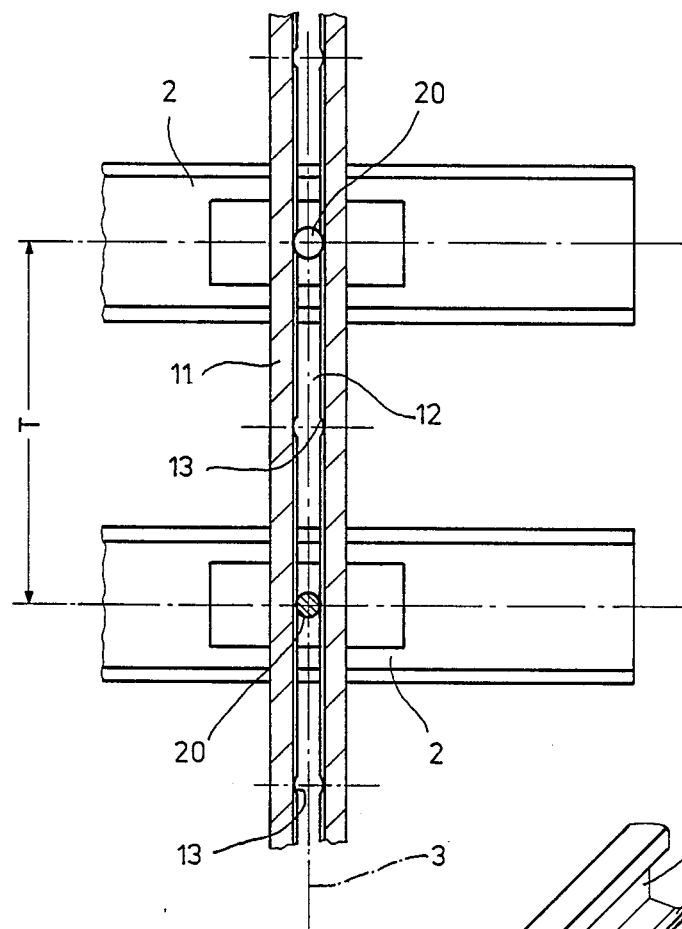

As it can be seen in FIG. 1, the rail 1 has a head 10 of conventional configuration and a flange 11 in whose bottom surface a groove 12 running parallel to the longitudinal axis 3 of the rail (FIG. 2) is formed with a more or less dovetail-shaped cross section. On the top side of each crosstie 2 there is formed a projection 20 in association with the rail 1, which has a cross-section that fits in the groove 12, i.e., that flares slightly toward the outer end. Of course, two projections 20 are associated with each crosstie and their distance between centers corresponds to the track gauge for which the tie is designed. By the interlocking or frictional engagement of the crosstie projection 20 in the longitudinal groove 12 in the rail, the rail is sufficiently tightly joined to all crossties of a track section. Additional fastening means externally engaging the rail base or flange 11, which might interfere with the ground clearance of the wheel flange 3' represented in FIG. 1, are not necessary. On the other hand, however, low replicas of rail fasteners corresponding to component 4 in FIG. 1 can simply be glued or fastened in any other appropriate manner on one or both sides alongside and over the rail base or flange.

The groove 12 in each rail base 11 is widened to form sockets 13 at equal intervals corresponding to a fraction of the crosstie spacing T. The crosstie projections made in the form of buttons 20 in the embodiment represented can be snapped into these sockets 13. This permits on the one hand an easy and precise establishment of the crosstie spacing T and on the other hand the assembly of a curved section of track, in which case the crosstie projections 20 can be set correspondingly closer together on the shorter inner rail. In the embodiment represented in FIG. 2, the groove widenings are in the shape of sectors of a circle; on the other hand, however, a wedge-shaped configuration associated with button-like crosstie projections is possible and reasonable.

Figure 3:
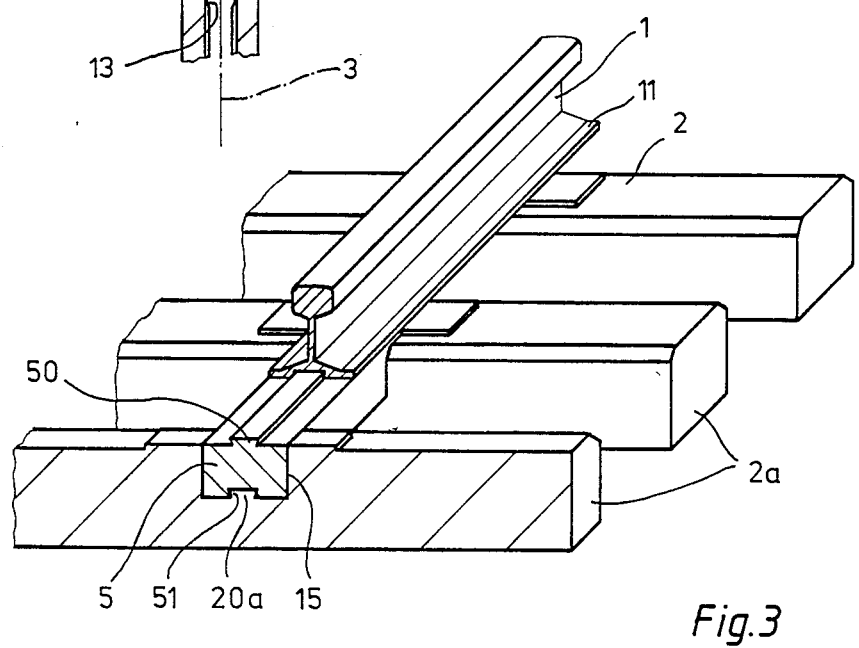
Figure 4:
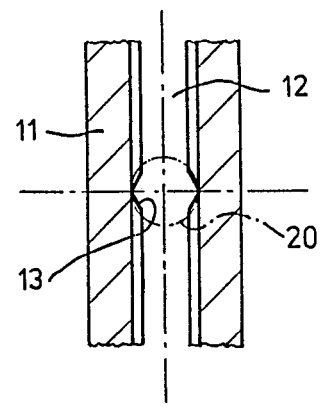

To join together two sections of rail, there is provided, in accordance with the cut-away view in FIG. 3, a strip-like connecting link 5 which usually consists of electrically conductive material (for insulating connecting links they are made of insulating material—plastic, for example). In the embodiment represented, the link 5 has on its flat side facing the rail 1 a dovetail-shaped projection 50, whose cross section matches the crosstie projection 20. This dovetail-shaped projection can be fitted into the grooves 12 formed in the flanges 11 of the two rails to be joined together, so that the electrical circuit from a first section of track to the second section of track is completed through the connecting link 5. In the crossties 2a which are to accommodate the connecting link 5, there is formed a socket groove 15 which is best made to match the cross section of the connecting link. In the area of the groove bottom is formed a projection 20a corresponding to the projection 20, which fittingly engages a socket 51 formed on the underside of the link 5. In the embodiment represented in FIG. 3, the crosstie projection 20a at the bottom of the groove in the crosstie 2a is in the form of a tongue which is engaged in a groove-like recess 51 in the bottom of the connecting link 5.

Instead of the individual crossties represented in the drawing, crosstie strips can be provided, in which case the junction sections of the crossties can be concealed in the bottom of the rails like the connecting link 5.

I claim:

1. A track for a model railway, comprising two essentially parallel rails, each rail having a base and a longitudinal axis; a groove of substantially dovetail cross section in each base parallel to the longitudinal axis of the respective rail, and a plurality of sockets providing access to said groove from underneath; a plurality of crossties located below and transverse to said two rails at spaced intervals; each crosstie having an upper side and a projection on said upper side, with a cross sectional profile fitting interlockingly or frictionally into the respective groove, and being releasably insertable in pushbutton-like manner through a respective socket into the groove; said projections being located completely within the groove and forming the sole means connecting the crossties to the rails.

2. A track according to claim 1, wherein the groove in each rail base is widened at said spaced intervals to form said sockets, each projection being in the form of a button adapted to be snapped into the respective socket.

3. A track according to claim 2, wherein the socket is in the form of a sector of a circle.

4. A track according to claim 2, wherein the socket is wedge-shaped.

5. A track for a model railway, comprising two essentially parallel rails, each rail having a base and a longitudinal axis; a groove of substantially dovetail cross section in each base parallel to the longitudinal axis of the respective rail, and a plurality of sockets providing access to said groove from underneath; a plurality of crossties located below and transverse to said two rails at spaced intervals; each crosstie having an upper side and a projection on said upper side, with a cross sectional profile fitting interlockingly or frictionally into the respective groove, and being releasably insertable in pushbutton-like manner through a respective socket into the groove; said projections being located completely within the groove and forming the sole means connecting the crossties to the rails; and a connecting link of electrically conductive material connecting one of said rails with an adjacent rail aligned with said one rail; said connecting link extending in a recess in two adjacent crossties below said one rail and said adjacent rail, and having an upper flat side facing said one rail and said adjacent rail; at least one projection on said flat side of a profile corresponding to that of said projections on said upper side of said crossties, said connecting link also having a lower side within said recess, a groove in said lower side fittingly receiving projections in said two crossties, said recess being of a depth such that said crosslink, except for at least one said projection on said flat side thereof, is flush with the upper side of said crossties.

6. A track according to claim 5, wherein the groove in each rail base is widened at said spaced intervals to form said sockets, each projection on each crosstie being in the form of a button adapted to be snapped into the respective socket.

7. A track according to claim 6, wherein the socket is in the form of a sector of a circle.

8. A track according to claim 6, wherein the socket is wedge-shaped.

9. A track according to any one of claims 1 to 8, comprising replicas of rail clamps without a holding function, respectively positively attached to said crossties adjacent said rails.

* * * * *